United States Patent
De Cremoux et al.

(10) Patent No.: US 8,515,599 B2
(45) Date of Patent: Aug. 20, 2013

(54) DEVICE AND METHOD FOR EVALUATION OF THE OPERATIONAL CAPABILITIES OF AN AIRCRAFT

(75) Inventors: Thibaut De Cremoux, Asnieres (FR); Salvador Lopez, Paris (FR); Philippe Le Van, Blanquefort (FR)

(73) Assignee: Dassault Aviation (FR)

( * ) Notice: Subject to any disclaimer, the term of this patent is extended or adjusted under 35 U.S.C. 154(b) by 0 days.

(21) Appl. No.: 13/428,454

(22) Filed: Mar. 23, 2012

(65) Prior Publication Data

US 2012/0245768 A1    Sep. 27, 2012

(30) Foreign Application Priority Data

Mar. 24, 2011   (FR) ..................................... 11 00884

(51) Int. Cl.
*G01C 23/00*    (2006.01)

(52) U.S. Cl.
USPC .................. 701/3; 701/34; 701/31.4; 701/31; 701/33; 340/963; 340/438; 340/439; 340/853.2; 340/3.43; 244/3.1; 244/3.3

(58) Field of Classification Search
USPC ............... 701/31.4, 29.1; 340/963, 438, 439, 340/853.2, 3.43; 244/3.1, 3.3, 158, 173, 244/75, 99.9; 714/1
See application file for complete search history.

(56) References Cited

U.S. PATENT DOCUMENTS

| | | | |
|---|---|---|---|
| 6,993,421 B2 * | 1/2006 | Pillar et al. .................... | 701/29.4 |
| 7,298,152 B1 * | 11/2007 | Wilke et al. .................... | 324/639 |
| 8,090,485 B2 * | 1/2012 | Grinits et al. ................... | 701/14 |
| 2010/0052948 A1 * | 3/2010 | Vian et al. ...................... | 340/963 |
| 2011/0029804 A1 | 2/2011 | Hadden et al. | |

OTHER PUBLICATIONS

Andrews et al., "A systems reliability approach to decision making in operating a phased mission," *Reliability & Maintainability Symposium, RAMS 2008, IEEE,* p. 8-14 (2008).
Search Report issued in app. No. FR1100884 (2011).

* cited by examiner

*Primary Examiner* — Redhwan K Mawari
(74) *Attorney, Agent, or Firm* — Barnes & Thornburg LLP

(57) ABSTRACT

A device for evaluation of the operational capabilities of an aircraft for informing a user about the capabilities of the aircraft to carry out a mission. Included are means for detecting malfunctions of aircraft equipment adapted for functioning during a mission. An evaluation device includes means for acquisition of information about the mission; a means for calculating observed feasibility level of the mission on the basis of at least one detected malfunction and the information obtained about the mission of the aircraft; and a means for presenting a synthetic reactive indicator, representative of the observed feasibility level of the mission in at least one instant of the mission. The means for acquisition, calculation and presentation are adapted for functioning during the mission, to inform the user about the observed feasibility level of the mission depending on the detection of new malfunctions and/or the modifications of the mission in course.

21 Claims, 4 Drawing Sheets

DEVICE AND METHOD FOR EVALUATION OF THE OPERATIONAL CAPABILITIES OF AN AIRCRAFT

CROSS-REFERENCE TO RELATED APPLICATIONS

This application claims priority to French application no. FR 1100884, filed Mar. 24, 2011, the disclosure of which is incorporated herein by reference in its entirety.

BACKGROUND

The present disclosure relates to a device for evaluation of the operational capabilities of an aircraft designed to inform a user about the capabilities of the aircraft to carry out a mission, the aircraft comprising multiple devices, and the evaluation device comprising means for detection of malfunctions of the equipments of the aircraft, with the means for detection adapted for functioning during the accomplishment of the mission.

It is known that an aircraft comprises multiple systems permitting it to carry out missions, such as transportation missions, in which the aircraft must reach a destination, after a departure point on the ground, in complete safety for its crew and its eventual passengers. These systems also comprise mechanical systems, such as the landing gear, the engines and the wings, as well as hydraulic systems, such as the steering control or the control of the brakes, and also electrical systems, such as the ventilators, and electronic systems, such as the so-called "boarding" systems. Typically, each system comprises multiple devices.

These devices have to be maintained, and each device may start to function incorrectly or to fail at one moment or other of the life of the aircraft. These malfunctions can be more or less serious from the point of view of the global functioning of the aircraft, to the extent in which redundancies are available and rescue equipment is provided in order to deal with the malfunctioning of certain devices.

The malfunctioning of the equipment of the aircraft imposes operational constraints affecting the operability of the aircraft, such as the limits related to the maximum speed of the aircraft, the maximum elevation at which the aircraft can fly, or the minimum landing distance for the aircraft.

Each operational limitation is generally the result of the conjunction of several malfunctions. Typically, the malfunctioning of a pump for supplying an engine of the aircraft with fuel does not lead to operational constraint insofar as there is a second pump, but the combined malfunctioning of two pumps for supplying the same engine leads to operational constraints (reduced flying range of the aircraft, limited speed, etc.).

Thus the operational constraints affect also the feasibility level of the mission. In effect, it is easy to understand that if, for example, the maximum elevation of the flight is reduced, the flying range of the aircraft is also reduced as a consequence, and that, therefore, there is a risk that the intended destination is outside of the flying range, and as a result the mission can not be completed.

It is known that most often the aircraft comprises a system for support of the steering of the aircraft and its piloting with the objective to inform the crew about the malfunctions detected in the equipment of the aircraft. This system is generally designed to indicate to the members of the crew the emergency maneuvering that has to be effected in order to ensure the viability of the aircraft as a result of the detection of a malfunction, as well as the operational constraints imposed by this malfunction.

The known operational support systems for aircraft pilots comprise generally a first display screen containing multiple pictograms, with each pictogram representing a device of the aircraft. This first screen is intended to provide to the members of the crew an overview of the detected malfunctions in the equipment.

An example of the first display screen of a known operational support system for aircraft pilots is presented in FIG. 1. This first display screen 10 presents a synoptic drawing of the equipment of the bleed air system of an aircraft. Each monitored device is presented here by a pictogram 11, 12, 13, 14, 15, 16 representing the equipment. Thus, pictogram 11 represents the left engine of the aircraft, pictogram 12 represents the right engine, pictogram 13 represents the central engine, pictogram 14 represents the wings, pictogram 15 represents the "auxiliary power unit"), and pictogram 16 represents an external power supply service.

The rectangles 18 represent the locations of the aircraft which are heated and aerated by the bleed air system, typically the cockpit and the passenger cabin of the aircraft. The crossed disks 20 represent schematically the gates of a system of air ducts conducting the air at the level of the equipment towards the aerated spaces. Depending on its orientation, each crossed disk 20 illustrates the fact that the associated gate is in open or closed configuration.

The display screen 10 is intended to provide an overview of the malfunctions detected at the equipment level of the bleed air system. To this purpose, each pictogram 11, 12, 13, 14, 15, 16 is set up to provide either the good functioning of the associated equipment or a malfunction of the equipment: typically, the pictogram 11, 12, 13, 14, 15 or 16 is green when the associated equipment does not present any malfunction, red when a malfunction of the associated equipment has been detected, and white—when the associated equipment has been deactivated.

In addition, the known operational support systems for aircraft pilots comprise generally a second display screen, which is intended to display a list of the operational constraints of the aircraft caused by the detected malfunctions. However, the known support systems are not fully satisfactory. In effect, they are limited to presenting to the members of the crew the detected malfunctions and the operational constraints arising from these malfunctions. Thus, the members of the crew must by themselves form an idea about the feasibility level of the mission, proceeding from the detected multiple malfunctions and the multiple operational constraints that are presented to them.

However, as aircraft become more complex, the number of the onboard devices increases, particularly due to the continuous reinforcement of the aviation regulation, and the crew members are thus often overwhelmed by the displays of minor malfunctions. In addition, the devices of the aircraft are becoming more and more interconnected, which makes difficult to appreciate the consequences of the malfunctioning of one of them. Moreover, the devices are often automated and certain technical data remain hidden from the crew. For these reasons, it is difficult for the members of the crew to form a correct idea about the feasibility level of the mission, which could lead to errors in the evaluation of the situation and taking bad decisions by the crew (for example, the crew may decide to discontinue the mission in course, although the operational capabilities of the aircraft permit its completion despite the malfunction that has occurred).

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

An objective of the disclosure is to provide a device for evaluation of the operational capabilities of an aircraft based on the goal of the mission to be executed, which is designed in a way to simplify the decision making process of the members of the crew.

To this end, an object of the disclosure is a device for evaluation of the aforementioned type, in which the evaluation devices includes: means for acquisition of information about the mission; means for calculation of observed feasibility level of the mission on the basis of at least one detected malfunction and information obtained about the mission of the aircraft; and means for presenting a synthetic reactive indicator, representative of the observed feasibility level of the mission in at least one given instant of the mission. The means for acquisition, calculation and presentation being adapted for functioning during the execution of the mission, in order to inform the user about the evolution of the observed feasibility level of the mission depending on the detection of new malfunctions and/or the modifications of the mission in course.

Depending on particular embodiments, the evaluation device according to the disclosure comprises also one or several of the following characteristics taken in isolation or on the basis of all their technically possible combinations. The evaluation device comprises means for acquisition of information about the operational environment of the aircraft, the means for calculation being designed to calculate the observed feasibility level of the mission on the basis of the information acquired about the operational environment of the aircraft, the means for acquisition being designed to function during the execution of the mission, in order to inform the user about the evolution of the observed feasibility level of the mission depending on the evolution of the operational environment of the aircraft. The calculation means comprise: means for determining at least one operational constraint caused by a detected malfunction or by each detected malfunction; means of control over the adequacy of each operational constraint with the mission and, eventually, with the operational environment of the aircraft, with the means of control designed to determine, for each operational constraint, an adequacy level of the operational constraint with the mission and, eventually, with the operational environment of the aircraft; and means for determining the observed feasibility level on the basis of each determined adequacy level.

The evaluation device comprises means for determining a probable future malfunction of an equipment of the aircraft and the means for establishing an foreseeable feasibility level of the mission in the case of occurrence of the probable future malfunction, with the presentation means set up in a way to present a synthetic predictive indicator representing the foreseeable feasibility level. The foreseeable feasibility level is based on the information acquired about the mission and eventually about the operational environment of the aircraft. The foreseeable feasibility level is a function of the or each detected malfunction. The observed feasibility level and/or the foreseeable feasibility level of the mission are set up to take at least three values different from each other, with the reactive and/or predictive indicator set up to represent each of the values. The evaluation device comprises means for acquisition of parameters of the aircraft, the calculation means, and eventually the establishment means, being set up to calculate and, respectively, establish the observed feasibility level, or, respectively, the predictive feasibility level, based on the acquired parameters of the aircraft.

An object of the disclosure is also a method for evaluation of the operational capabilities of an aircraft, characterized in that it comprises the following stages: detecting at least one malfunction; acquiring information about the mission of the aircraft; calculating, on the basis of each detected malfunction and the information obtained about the mission of the aircraft, of an observed feasibility level of the mission; and presenting a synthetic reactive indicator that is representative for the observed feasibility level. The preceding stages being repeated several times during the execution of the mission, in order to inform the user about the evolution of the observed feasibility level of the mission depending on the detection of new malfunctions and/or the modifications of the mission in course.

In a preferred embodiment of the disclosure, the evaluation method comprises also the following stages: determining a probable future malfunction; establishing a foreseeable feasibility level of the mission, in the case of occurrence of a probable future malfunction; and presenting a synthetic predictive indicator that is representative for the foreseeable feasibility level.

BRIEF DESCRIPTION OF THE DRAWINGS

Other characteristics and advantages of the disclosure will appear during the reading of the description to follow, which is provided only as an example and refers to the annexed drawings on which.

Figure 1:
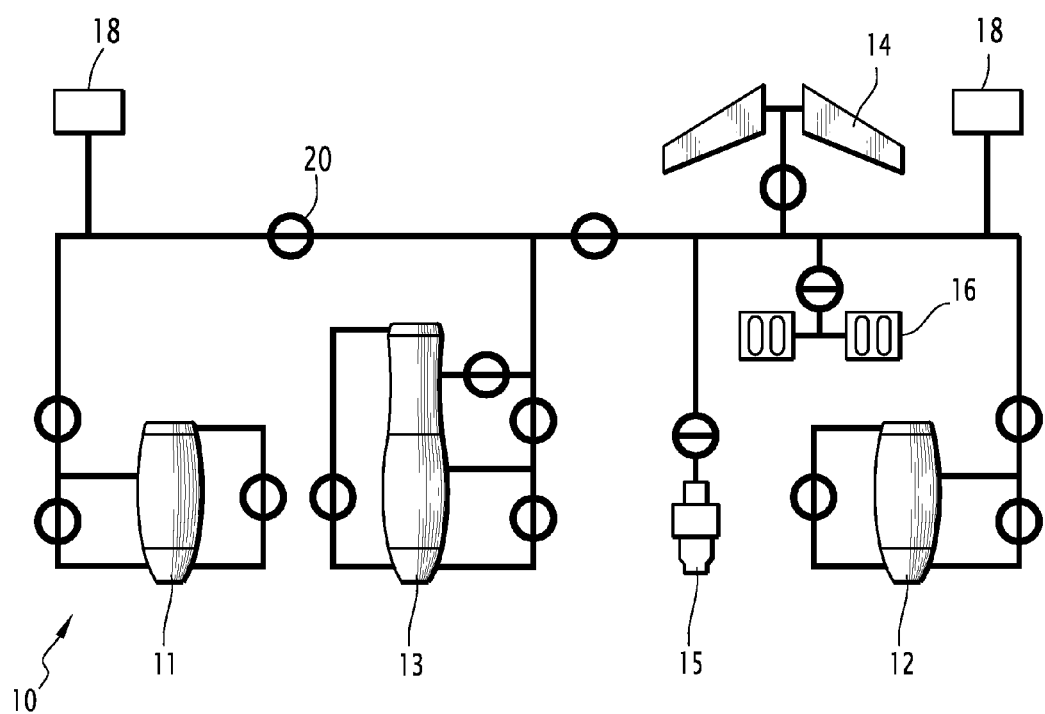
FIG. 1 is a view of a display screen of a state of the art system for support of the piloting of the aircraft.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure.

The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 2:
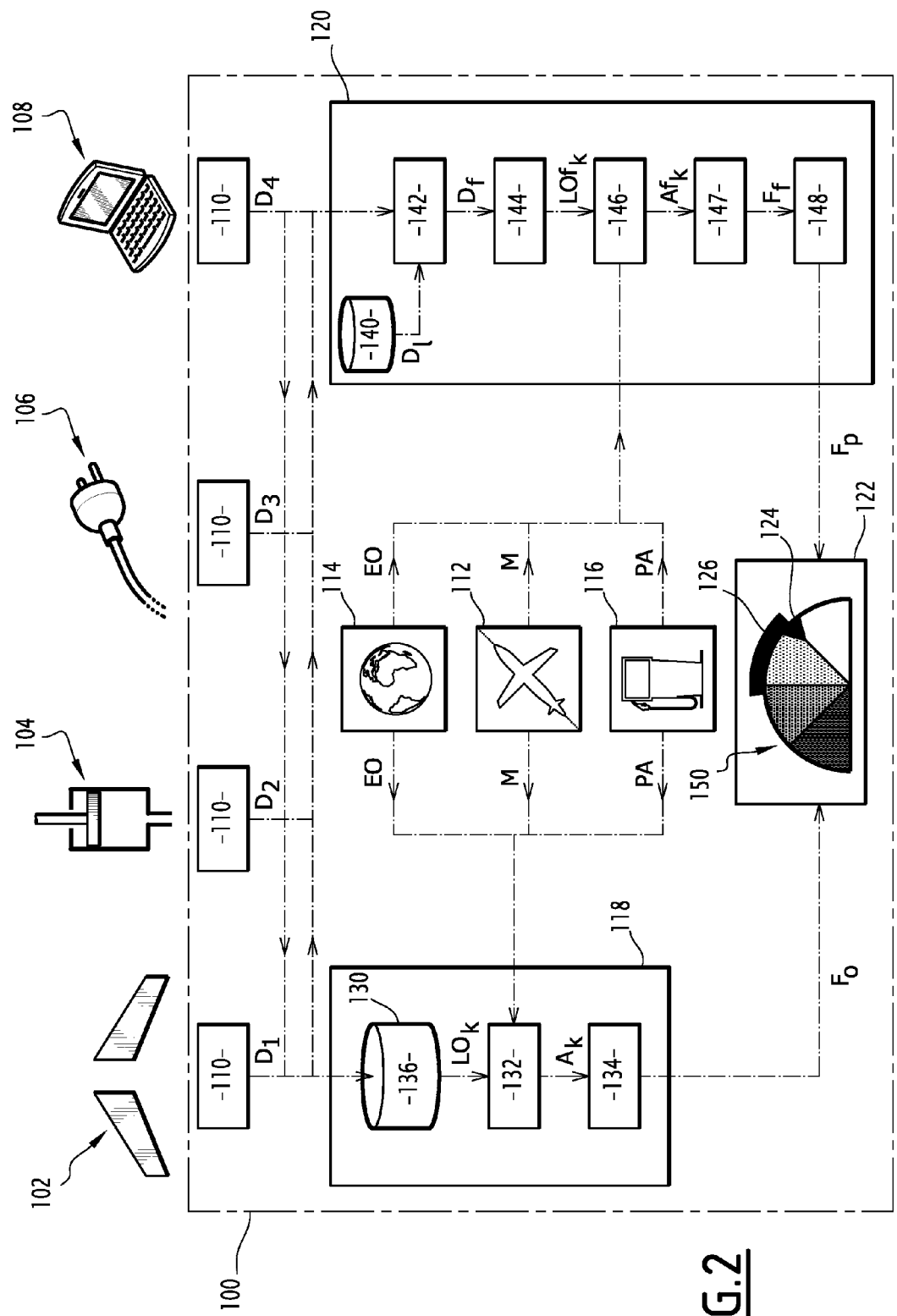
FIG. 2 is a diagram presenting an evaluation device according to the disclosure.

The device 100 for evaluation of the operational capabilities of an aircraft, presented in FIG. 2, is designed for mounting on an aircraft, typically a plane, whose equipments 102, 104, 106, 108 are presented in FIG. 2. These equipments consist of the wings 102 of the aircraft, the hydraulic system 104, the electrical network 106, and a data processing system 108. It is understandable that this equipment is given only as an example and that the aircraft comprises also other equipment which, for the sake of simplicity, is not represented.

The evaluation device 100 comprises a number n of means 110 for detection of malfunctions $D_i$ (i is an integer between 1 and r, with r equal to the number of detected malfunctions, r being less than or equal to n) of the equipments 102, 104, 106, 108. These means of detection 110 are typically transducers of voltage, pressure or others, mounted on or close to the equipments of the aircraft.

The evaluation device 100 comprises also means 112 for acquisition of information M about the mission of the aircraft, means 114 for acquisition of information EO about the operational environment of the aircraft, means 116 for acquisition of information PA about the parameters of the aircraft (such as the volume of the fuel remaining onboard, the mass of the aircraft, the volume of the loaded oxygen, the list of the equipment that is temporarily unavailable, etc.), means 118 for calculation of an observed feasibility level $F_O$ of the mission, means 120 for establishing a foreseeable level $F_p$ of the mission, and means 122 for the presentation of the indicators 124, 126 representative for the observed $F_O$ and foreseeable $F_p$ feasibility levels.

Each one of the acquisition means 112, 114, 116, the calculation means 118, the establishing means 120, and the presentation means 122 is designed to function during the flight. In particular, each one of the acquisition means 112, 114, 116, the calculation means 118, the establishing means 120, and the presentation means 122 is designed to function continuously during the execution of the mission, in a way to keep the user continuously informed about the evolution of the observed feasibility level $F_O$ and the foreseeable feasibility level $F_p$, based on the detection of new malfunctions, the modifications of the mission, the evolution of the operational environment and/or the evolution of the parameters of the aircraft.

Each one of the acquisition means 112, 114, 116 consists typically of an electronic module comprising internal memory, a processor and external communication ports.

The information M about the mission of the aircraft comprises information about the flight plan, the destination that has to be reached, as well as about the different transit stages where it is planned for the aircraft to land before reaching its destination. The information M comprises also information about the approach profiles foreseen for every landing, as well as information about the characteristics of each of the runways, on which these landings are to take place (length, width, elevation and coating of the surface of the runway, the presence a guidance system and/or a maintenance service at the respective airport, etc.). The acquisition means 112 are typically designed to acquire this information M from the other onboard systems of the aircraft, such as the flight management system. It should be noted that the data of the flight plan are recorded in the systems by the pilot prior to the start of the mission.

The "operational environment" consists of both the physical environment surrounding the aircraft at any moment and the physical environment expected to surround the aircraft later if it follows its flight plan. The acquisition means 112 are typically designed to acquire information EO about the operational environment of the aircraft from other onboard systems of the aircraft, such pressure probe, probe for the outside temperature and/or meteorological radar.

The acquisition means 116 are typically designed to acquires information PA about the parameters of the aircraft, such as, namely, the level of the remaining fuel onboard from the fuel gauge of the aircraft and the masse of the aircraft from a sensor or by consulting the flight management system of the flight in which the mass of the aircraft has been previously entered by the pilot.

The calculation means 118 comprise means 130 for determining the operational constraints $LO_k$ (k is an integer between 1 and m, m being the number of the operational constraints) caused by the detected malfunctions $D_i$, means 132 for control of the adequacy of each operational constraint $LO_k$ to the mission of the aircraft, and means 134 for deduction of the observed feasibility level $F_O$ of the mission.

Figure 3:
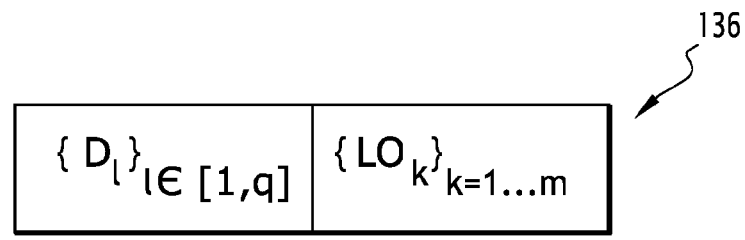
FIG. 3 is a matrix illustrating the data stored in a first database of the evaluation device of FIG. 2.

The determination means 130 comprise typically a first database 136, which is presented in FIG. 3. As it can be seen in this figure, the database 136 associates to each combination of possible malfunctions $D_l$ (l is an integer between 1 and q, q being the number of the possible malfunctions $D_l$) at least one operational constraint $LO_k$. Thus, the determination means 130 are designed to determine, on the basis of each detected malfunction $D_i$, the operational constraints $LO_k$ affecting the operability of the aircraft.

The control means 132 are designed to control the adequacy of the operational constraints $LO_k$ to the mission of the aircraft, the operational environment of the aircraft and the parameters of the aircraft. To this effect, the means of control 132 are designed to establish a level $A_k$ of adequacy of each operational constraint $LO_k$ on the basis of the information M, EO and PA obtained through the acquisition means 112, 114, 116.

Those skilled in the art would be able to implement without problems these means of control by using, for example, the deductive logic, statistical methods, solvers of equations/constraints, neural networks, etc.

The adequacy level $A_k$ is set to take j+1 different values, typically integer numeric values between 0 and j, with 0 representing adequacy null between the operational constraint $LO_k$ and the considered information (mission, operational environment, parameters of the aircraft), and j representing a complete adequacy between the operational constraint $LO_k$ and the considered information. Thus, when the adequacy level $A_k$ is equal to 0, the mission can not be realized due to the operational constraint $LO_k$, because it is not adequate to the continuation of the mission, and when the adequacy level $A_k$ is equal to j, the mission can continue despite the operational constraint $LO_k$, because there is no risk that it could impede the continuation of the mission.

When the adequacy level $A_k$ is strictly between 0 and j, the operational constraint $LO_k$ is partially compatible with the mission, i.e. the operational constraint $LO_k$ impedes the good development of the mission, typically by causing a delay in the arrival or requiring a modification of the flight plan, with the destination remaining reachable. The more the operational constraint $LO_k$ causes a delay and modifications of the flight plan the closer to 0 is the adequacy level $A_k$. The adequacy level $A_k$ associated to an operational constraint $LO_k$, which does not cause modifications of the flight plan for catching up with the next stage of the transit, is higher than the adequacy level $A_k$, which is associated with an operational constraint $LO_k$ causing such modifications of the flight plan. Generally speaking, the higher the adequacy level $A_k$ the less the associated operational constraint $LO_k$ impedes the good execution of the mission.

Preferably, j is at least equal to 2, i.e. the adequacy level $A_k$ is set up to take at least three different values.

The adequacy level $A_k$ is established by means of an appropriate algorithm developed specifically for each operational constraint $LO_k$. Examples of these algorithms will be provided below.

In a first case, the considered operational constraint $LO_k$ is a reduction of the maximum altitude of the aircraft during the flight, when the detected malfunction $D_i$ is at the origin of this operational constraint $LO_k$ which, for example, is a fault in the sealing of a pressurization valve. The algorithm for determining the associated adequacy level $A_k$ is adapted for:

Calculating a range of action of the aircraft on the base of the new maximum authorized altitude and the parameters of the aircraft PA (particularly the level of the remaining fuel), Evaluating, on the basis of the information M about the mission, the remaining distance to be traveled in order to reach the destination, Determining whether the destination is within the range of the aircraft and, if necessary, calculating the estimated delay, and Assigning a value to the adequacy level $A_k$, such as: the value is strictly between 0 and j if the destination is within the range of action of the aircraft, this value depending on the calculated level of the delay; and the value is equal to 0 if the destination is outside of the range of action of the aircraft or if the delay impedes the access to the airport (airport closed at the scheduled arrival time).

In a second case, the considered operational constraint $LO_k$ is an interdiction to fly in zones, which are not covered by short wave communication means, the detected malfunction $D_i$ in the origin of this operational constraint $LO_k$ being, for example, a fault in the high frequency radio communication (commonly known as HF radio). The algorithm for determining the associated adequacy level $A_k$ is adapted for:

Determining, on the basis of the information M about the mission, the zones traversed by the aircraft in order to reach its destination, Determining, on the basis of the information EO about the operational environment of the aircraft, whether the traversed zones are covered or not by short wave communication means, and Assigning a value to the adequacy level $A_k$, such as: the value is equal to j if all traversed zones are covered by short wave communication means; the value is strictly between 0 and j if it is planned that the aircraft will traverse zones, which are not covered by short wave communication means, but that it is possible for the aircraft either to circumvent these zones, at the cost of a longer flight time, or to be repaired during a transit period preceding the zones to be traverses; and the value is equal to 0 if the aircraft must traverse a zone, which is not covered by short wave communication means, in order to reach its destination, and that there is no possibility to circumvent this zone or for a possible repair during the transit period preceding the zones to be traversed.

Those skilled in the art would be able to define without problem the algorithms for determining the adequacy levels $A_k$ associated with other operational constraints $LO_k$.

Alternatively, the means for control 132 are set up to determine each adequacy level $A_k$ on the basis of the single information M, or based on the single information M and EO, or on the basis of the single information M and PA.

The means for deduction 134 are set up to deduct the observed feasibility level $F_O$ on the basis of the adequacy level(s) $A_k$ determined through the means of control 132. Those skilled in the art would be able to implement without problem these means for deduction by using, for example, the deductive logic, statistical methods, solvers of equations/constraints, neural networks, etc.

The feasibility level $F_O$ is typically set up to accept multiple numeric values between 0 and j; j illustrates the fact that the mission can be executed without particular difficulties and 0 illustrates the impossibility to complete the mission. The intermediate values comprised strictly between 0 and j, illustrate the fact that the mission can be executed, but with certain complications. The higher the value of the observed feasibility level $F_O$ is, the easier the mission can be executed.

The deduction means 134 are set up to deduct the feasibility level $F_O$ as equal to the adequacy level $A_k$ the closest to 0.

Returning to FIG. 2, the establishment means 120 comprise a second database 140, means 142 for determining a probable future malfunction $D_f$, means 144 for determining future operational constraints $LOf_k$ in the case of occurrence of a probable future malfunction $D_f$, means 146 for control over the adequacy of each future operational constraint $LOf_k$ on the mission, means 147 for evaluation of the level $F_f$ of the future feasibility of the mission in the case of occurrence of a probable future malfunction $D_f$, and means 148 for deduction of the foreseeable feasibility level $F_p$.

Figure 4:
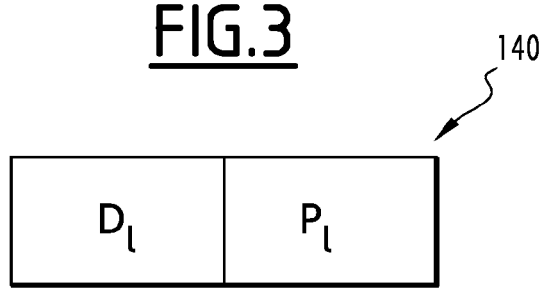
FIG. 4 is a matrix illustrating the data stored in a second database of the evaluation device of FIG. 2.

The second database 140 is represented in FIG. 4. As it is illustrated in this figure, the database 140 stores multiple possible malfunctions $D_l$ and for every possible malfunction $D_l$,—an associated probability $P_l$ for the occurrence of the possible malfunction $D_l$. Preferably, the probability $P_l$ for the occurrence of at least one possible malfunction $D_l$ is a function of the detected malfunctions $D_i$.

The determination means 142 are set up to determine, on the basis of the detected malfunctions $D_i$ and the database 140, the probable future malfunction $D_f$ as a possible malfunction $D_i$, which has not yet been detected, with the highest associated probability for occurrence $P_i$.

The means 144 for determining the future operational constraints $LOf_k$ are similar to the determination means 130. Preferably, they comprise the same database as the database 136.

The means for control 146 are similar to the means for control 132. In particular, they are designed to determine the future adequacy level $Af_k$ of every future operational constraint $LOf_k$ as a function of the information values M, EO and PA obtained by the acquisition means 112, 114, 116 by means of the same algorithms as those used by the control means 132.

The future feasibility level $F_f$ is set up to take the same values as the observed feasibility level $F_O$. The evaluation means 147 are set up to evaluate the future feasibility level $F_f$ as equal to the future adequacy level $Af_k$ the closest to 0.

The deduction means 148 are set up to deduct the foreseeable feasibility level $F_p$ as equal to the future feasibility level $F_f$.

Alternatively, the evaluation means 147 are set up to evaluate, for each possible malfunction $D_l$, an associated future feasibility level $F_f$; the deduction means 148 are then set up to select, among the evaluated multiple future feasibility levels $F_f$, the future feasibility level $F_f$ associated to the possible malfunction $D_l$ with the highest probability of occurrence $P_l$ and to deduct the foreseeable feasibility level $F_p$ as equal to the selected future feasibility level $F_f$.

The presentation means 122 are set up to present a unique synthetic reactive indicator 124, representative of the observed feasibility level $F_O$, and a unique predictive synthetic indicator 126, representative of the foreseeable feasibility level $F_p$. "Synthetic" means that each indicator, respectively 124, 126, is set up to present a synthesis of the observed feasibility level $F_O$, respectively the foreseeable feasibility level $F_p$. Thus, the user of the evaluation device 100 has available condensed information, which is easily accessible and permits him to take quickly a decision regarding the continuation of the mission.

In the shown example, the presentation means 122 are the display means, and the reactive indicators 124 and the predictive indicators 126 are regrouped in a single graphic 150 representing a half disk cut into quarters, with an arrow placed between two quarters constituting the reactive indicator 124, and one strip extended at the periphery of the half disk, from the arrow to a quarter, which is not in contact with the arrow, constituting the predictive indicator 126.

Alternatively (not represented), the single graphic 150 is a ladder scale with each of its different steps representing a feasibility level of the mission, the reactive indicator 124 is an arrow located on or next to a step, the predictive indicator 126 is a strip extended between two steps of the ladder.

These embodiments of the indicators 124, 126 in the form of a single graphic regrouping these indicators 124, 126 permit an intuitive comprehension of the indicators 124, 126 by the user of the evaluation device 100.

Figure 5:
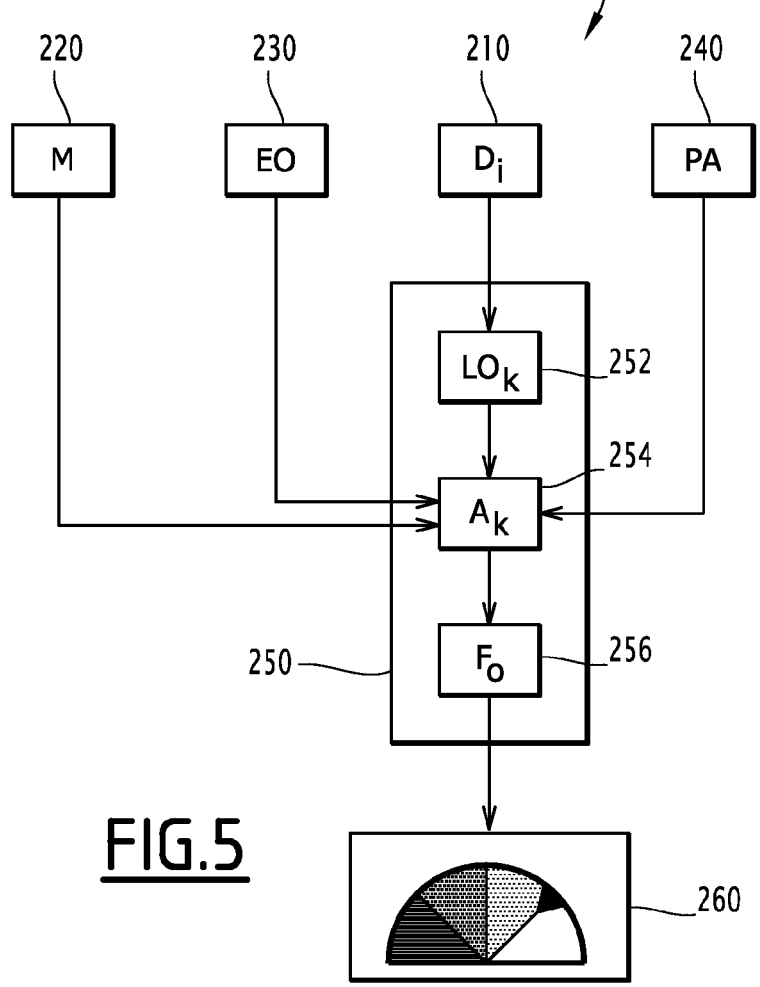
FIG. 5 is a block-diagram illustrating a method for evaluation of an observed feasibility level of the mission, realized by the evaluation device of FIG. 2.

A first method 200 for evaluation of the observed feasibility level $F_O$, used by the evaluation device 100, will be described now in relation to FIG. 5.

The first method 200 comprises a first stage 210 for the determination of at least one malfunction $D_i$ in at least one device of the aircraft, accompanied by a stage 220 for acquisition of information M about the mission of the aircraft and, preferably, by a stage 230 for acquisition of information EO about the operational environment of the aircraft, and/or a stage 240 for acquisition of the aircraft parameters PA (namely, the remaining volume of onboard fuel). The first stage 210 is followed by a second stage 250 for calculation of the observed feasibility level $F_O$, and then by a third stage 260 for presenting the reactive indicator 124.

During the first stage 210, the detection means 110 detect an eventual malfunction $D_i$ of the equipment 102, 104, 106, 108. Then they inform the calculation means 118 about each detected malfunction $D_i$.

During the stage 220, the acquisition means 112 read out the information M about the mission of the aircraft, typically the navigation and localization data, from a memory storing the flight plan of the aircraft and from a geo-localization system and transfer this information M to the calculation means 118.

During the stage 230, the acquisition means 114 collect the information EO about the operational environment of the aircraft, typically the meteorological data, from the other onboard systems of the aircraft and transfer this information EO to the calculation means 118.

During the stage 240, the acquisition means 116 collect the parameters of the aircraft PA and transfer this information M to the calculation means 118.

The second stage 250 comprises a first sub-stage 252 for determination of at least one operational constraint $LO_k$ caused by each detected malfunction $D_i$, followed by a second sub-stage 254 for control over the adequacy of each operational constraint $LO_k$ with the mission, followed by a third sub-stage 256 for deduction of the observed feasibility level $F_O$.

During the first sub-stage 252, the determination means 130 determine each operational constraint $LO_k$ caused by each detected malfunction $D_i$, with the help of the database 136.

During the second sub-stage 254, the control means 132 determine the adequacy level $A_k$ of each operational constraint $LO_k$ with the mission and, preferably, with the operational environment of the aircraft and/or with the parameters of the aircraft.

During the third sub-stage 256, the deduction means 134 deduct the observed feasibility level $F_O$ from each adequacy level $A_k$.

Finally, during the third stage 260, the presentation means 122 present the single reactive indicator 124.

The stages 210, 220, 230, 240, 250, 260 are repeated indefinitely during the operation of the aircraft in a way to keep the members of the crew informed about the evolution of the observed feasibility level $F_O$ of the mission.

Figure 6:
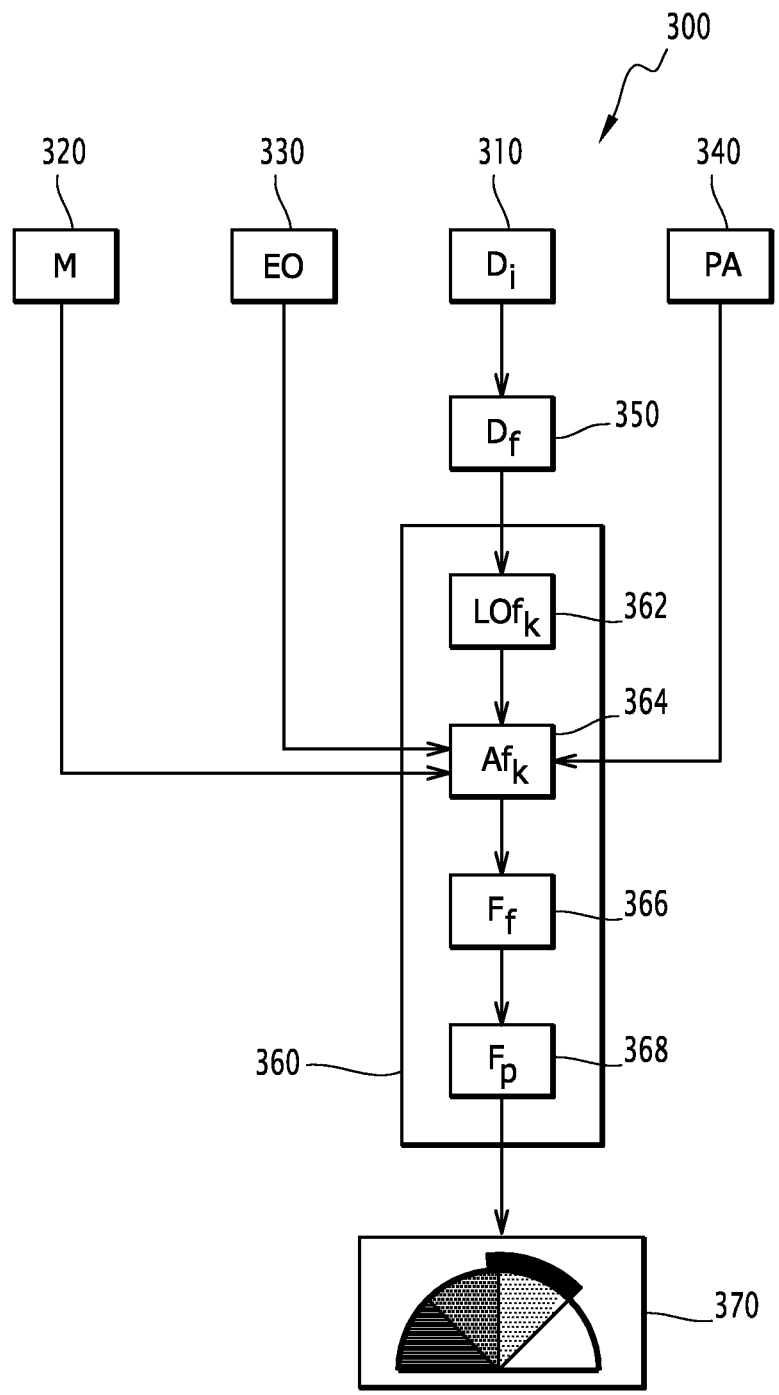
FIG. 6 is a block-diagram illustrating a method for evaluation of a foreseeable feasibility level of the mission, realized by the evaluation device of FIG. 2.

A second method 300 for evaluation of the foreseeable feasibility level $F_O$, used by the evaluation device 100, will be described now in relation to FIG. 6.

The second method 300 comprises a first stage 310 for the determination of at least one malfunction $D_i$ in at least one device of the aircraft, accompanied by a stage 320 for acquisition of information M about the mission of the aircraft and, preferably, by a stage 330 for acquisition of information EO about the operational environment of the aircraft, and/or a stage 340 for acquisition of the aircraft parameters PA. The first stage 310 is followed by a second stage 350 for the determination of a probable future malfunction $D_f$, followed by a third stage 360 for establishing the foreseeable feasibility level $F_p$, and then by a fourth stage 370 for presentation of the predictive indicator 126.

Each stage, respectively 310, 320, 330, 340, is identical to the stage 210, 220, 230, 240, respectively, of the second method 200. For the description of these stages, the reader is invited to refer to the description that was provided above.

During the second stage 350, the determination means 142 determine the probable future malfunction $D_f$ with the help of the database 140 as a possible malfunction $D_i$, which has not yet been detected, with which the highest probability of occurrence $P_l$ is associated. Then the determination means 142 inform the determination means 144 about the nature of the probable future malfunction $D_f$.

The third stage 360 comprises a first sub-stage 362 for the determination of at least one future operational constraint $LOf_k$ caused by the occurrence of the probable future malfunction $D_f$, followed by a second sub-stage 364 for control over the adequacy of each future operational constraint $LOf_k$ with the mission, followed by a third sub-stage 366 for evaluation of the future feasibility level $F_f$ of the mission in the case of occurrence of the probable future malfunction $D_f$, which is followed by a fourth sub-stage 368 for deduction of the foreseeable feasibility level $F_p$.

During the first sub-stage 362, the determination means 144 determine each future operational constraint $LOf_k$ caused by the probable future malfunction $D_f$, in the case of occurrence of the malfunction $D_f$, with the help of the database 136.

During the second sub-stage 364, the control means 146 determine the adequacy level $Af_k$ of the future adequacy of each future operational constraint $LOf_k$ with the mission and, preferably, with the operational environment of the aircraft and/or with the parameters of the aircraft.

During the third sub-stage 366, the evaluation means 147 evaluate the future feasibility level $F_f$ from each future adequacy level $Af_k$.

During the fourth sub-stage 368, the deduction means 148 deduct the foreseeable feasibility level $F_p$ of the future feasibility level $F_f$.

Finally, during the third stage 370, the presentation means 122 present the single predictive indicator 126.

The stages 310, 320, 330, 340, 350, 360, 370 are repeated indefinitely during the operation of the aircraft in a way to keep the members of the crew informed about the evolution of the foreseeable feasibility level $F_p$ of the mission.

As an example, let us suppose that the engines of the aircraft have each two fuel supply pumps and that the detection means 110 detect a single malfunction $D_i$ which is a fault in one of these fuel supply pumps. Since the respective engine affected by the fault has a second fuel supply pump, it continues to be supplied with fuel and the determination means 130 determine absence operational constraint $LO_k$ as a result of this malfunction $D_i$. Therefore, the calculation means 118 calculate observed feasibility level $F_O$ equal to j.

Let us suppose that after this detected malfunction $D_i$, the possible malfunction $D_l$ with the highest occurrence probability $P_l$ is the failure of a fuel supply pump of the other engine. The determination means 142 determine then this fault as being the probable future malfunction $D_f$. Since the other engine also has a second fuel supply pump, the occurrence of this malfunction $D_f$ would not affect the normal operation of the engine. However, taking into account the malfunction $D_i$ detected in the other fuel supply pump, the ulterior departure with one pump of the aircraft unavailable would be prohibited. Therefore, the determination means 144 determine the following future operationally constraint $LOf_k$: maintenance intervention is needed at the next transit stage. Then the establishment means 120 establish a foreseeable feasibility level $F_p$ comprised strictly between 0 and j.

Let us suppose now that, instead of the failure of one fuel supply pump of the other engine, the possible malfunction $D_l$ with the highest occurrence probability $P_l$ after the detected malfunction $D_i$ is the failure of the other fuel supply pump of the same engine. The determination means 142 determine then this fault as being the probable future malfunction $D_f$. In the case of occurrence of this probable future malfunction $D_f$, the engine will not be supplied with fuel anymore. Then the determination means 144 determine multiple future operational constraints $LOf_k$ as a result of the loss of one engine: Limit to the range of action of the aircraft, limit to the speed, etc. The establishment means 120 establish then a foreseeable feasibility level $F_p$ equal to 0.

In this way, one conceives easily the interactions that exist between the detected malfunctions and the probable future malfunctions, and the influence of the detected malfunctions on the foreseeable feasibility level $F_p$.

Thanks to the disclosure, the members of the crew will understand better the operational capabilities of the aircraft. The taking into consideration the mission in the evaluation of the observed feasibility level of the mission permits to highlight only the malfunctions, which can really compromise the mission, thus avoiding to overload the members of the crew.

In addition, the taking into account of the operational environment EO and the parameters PA of the aircraft permits to improve the evaluation of the feasibility level by the evaluation device.

Moreover, the integration of a predictive indicator anticipating the occurrence of future malfunctions reinforces much more the anticipation capacities of the members of the crew.

Lastly, the observed and the foreseeable feasibility levels, which can take multiple values, introduce a gradation in the evaluation of the feasibility level of the mission and permit to the members of the crew to follow the evolution of the operational capabilities of the aircraft, thus avoiding the risk that the members of the crew would be informed too late about the impossibility to perform a mission.

It should be noted that the device according to the disclosure can function perfectly differently than in the known mode, for example by performing at regular interval the acquisition of data and updating the display of the indicators, either upon request by the crew or only when a new malfunction has been detected, in a way to reduce the calculation resources necessary for the use of such a device.

It should also be noted, that in a preferred variant of the disclosure, the evaluation device 100 comprises multiple presentation means 122, with each presentation means 122 set up to present a unique reactive indicator 124 and unique predictive indicator 126 to a specific user. For example, the evaluation device 100 comprises two display screens located in the cockpit of the aircraft, the first one intended to present the indicators 124, 126 to the pilot of the aircraft, and the second screen intended to present the indicators 124, 126 to the copilot.

The device 100 was described as comprising at the same time the means 118 for calculation of the observed feasibility level $F_O$ and the means 120 for establishing the level of the foreseeable feasibility level $F_p$. However, in a variant, the device 100 comprises either the calculation means 118 or the establishment means 120 only.

Also, an object of the disclosure is a device for evaluation of the future operational capacities of an aircraft with the purpose to inform a user about the capabilities of the aircraft to execute a given mission; since the aircraft comprises multiple devices, the evaluation device comprises: means for determining the probable future malfunctions of a given device of the aircraft; means for establishing a foreseeable feasibility level of the mission in the case of occurrence of a probable future malfunction; and means for presenting a synthetic predictive indicator, representative of the foreseeable feasibility level in at least one given instant of the mission.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. An evaluation device for evaluation of the operational capabilities of an aircraft designed to inform a user about the capabilities of the aircraft to carry out a mission, the aircraft comprising multiple devices and the evaluation device including means for detection of malfunctions ($D_i$) of the equipments of the aircraft, with the means for detection adapted for functioning during the accomplishment of the mission, the evaluation device comprising:

means for acquisition of information (M) about the mission;

means for calculation of an observed feasibility level ($F_O$) of the mission on the basis of at least one detected malfunction ($D_i$) and information (M) obtained about the mission of the aircraft; and means for presentation of a synthetic reactive indicator, representative of the observed feasibility level ($F_O$) of the mission in at least one given instant of the mission;

the means for acquisition, calculation and presentation being adapted for functioning during the execution of the mission, in order to inform the user about the evolution of the observed feasibility level ($F_O$) of the mission depending on detection of new malfunctions ($D_i$) and/or modifications of the mission in course, wherein the evaluation device further comprises means for acquisition of information (EO) about the operational environment of the aircraft, the means for calculation being designed to calculate the observed feasibility level of the mission ($F_O$) on the basis of the information (EO) acquired about the operational environment of the aircraft, said means for acquisition being designed to function during the execution of the mission, in order to inform the user about the evolution of the observed feasibility level of the mission ($F_O$) depending on the evolution of the operational environment of the aircraft.

2. The evaluation device according to claim 1, further comprising means for determination of a probable future malfunction ($D_f$) of an equipment of the aircraft and means for establishment of a foreseeable feasibility level ($F_p$) of the mission in the case of occurrence of the probable future malfunction ($D_f$), the means for presentation being designed to present a synthetic predictive indicator representative of the foreseeable feasibility level ($F_p$).

3. The evaluation device according to claim 2, wherein the foreseeable feasibility level ($F_p$) depends on the information obtained about the mission (M), and on the operational environment (EO) of the aircraft.

4. The evaluation device according to claim 2, wherein the foreseeable feasibility level ($F_p$) depends on the at least one detected malfunction ($D_i$).

5. The evaluation device according to claim 1, the means for calculation further comprising:

means for determining at least one operational constraint ($LO_k$) caused by the at least one detected malfunction ($D_i$);

means of control over the adequacy of each operational constraint ($LO_k$) with the mission and with the operational environment of the aircraft, said means of control being designed to determine, for each operational constraint ($LO_k$), an adequacy level ($A_k$) of the operational constraint ($LO_k$) with the mission and with the operational environment of the aircraft; and means for determining the observed feasibility level ($F_O$) on the basis of each determined adequacy level ($A_k$).

6. The evaluation device according to claim 1, wherein the observed feasibility level ($F_O$) of the mission is set up to take at least three values different from each other, with the reactive indicator set up to represent each of said values.

7. The evaluation device according to claim 1, further comprising means for acquisition of parameters of the aircraft (PA), the means for calculation being set up to calculate the observed feasibility level ($F_O$) based on the acquired parameters of the aircraft (PA).

8. A method for evaluation of the operational capabilities of an aircraft, comprising the following steps:

detecting at least one malfunction ($D_i$);

acquiring information (M) about the mission of the aircraft;

acquiring information (EO) about the operational environment of the aircraft;

calculating, on the basis of each detected malfunction ($D_i$) and the information (M) obtained about the mission of the aircraft and the information (EO) acquired about the operational environment of the aircraft, an observed feasibility level ($F_O$) of the mission; and presenting a synthetic reactive indicator (124) that is representative for the observed feasibility level ($F_O$);

the preceding steps being repeated several times during the execution of the mission, in order to inform the user about the evolution of the observed feasibility level ($F_O$) of the mission depending on detection of new malfunctions ($D_i$) and/or modifications of the mission in course and/or evolution of the operational environment of the aircraft.

9. A method for evaluation of the operational capabilities of an aircraft according to claim 8, further comprising the following steps:

determining a probable future malfunction ($D_f$);

establishing a foreseeable feasibility level ($F_p$) of the mission, in the case of occurrence of a probable future malfunction ($D_f$); and presenting a synthetic predictive indicator that is representative for the foreseeable feasibility level ($F_p$).

10. The evaluation device according to claim 2, wherein the foreseeable feasibility level ($F_p$) of the mission is set up to take at least three values different from each other, with the predictive indicator set up to represent each of said values.

11. The evaluation device according to claim 2, further comprising means for acquisition of parameters of the aircraft (PA), the means for establishment being set up to establish the foreseeable feasibility level ($F_p$) based on the acquired parameters of the aircraft (PA).

12. An evaluation device for evaluation of the operational capabilities of an aircraft designed to inform a user about the capabilities of the aircraft to carry out a mission, the aircraft comprising multiple devices and the evaluation device including means for detection of malfunctions ($D_i$) of the equipments of the aircraft, with the means for detection adapted for functioning during the accomplishment of the mission, the evaluation device comprising:

means for acquisition of information (M) about the mission;

means for calculation of an observed feasibility level ($F_O$) of the mission on the basis of at least one detected malfunction ($D_i$) and information (M) obtained about the mission of the aircraft; and means for presentation of a synthetic reactive indicator, representative of the observed feasibility level ($F_O$) of the mission in at least one given instant of the mission;

the means for acquisition, calculation and presentation being adapted for functioning during the execution of the mission, in order to inform the user about the evolution of the observed feasibility level ($F_O$) of the mission depending on detection of new malfunctions ($D_i$) and/or modifications of the mission in course, wherein the means for calculation include:

means for determining at least one operational constraint ($LO_k$) caused by the at least one detected malfunction ($D_i$);

means of control over the adequacy of each operational constraint ($LO_k$) with the mission of the aircraft, said means of control being designed to determine, for each operational constraint ($LO_k$), an adequacy level ($A_k$) of the operational constraint ($LO_k$) with the mission of the aircraft; and means for determining the observed feasibility level ($F_O$) on the basis of each determined adequacy level ($A_k$).

13. The evaluation device according to claim 12, further comprising means for the determination of a probable future malfunction ($D_f$) of an equipment of the aircraft and means for establishment of a foreseeable feasibility level ($F_p$) of the mission in the case of occurrence of the probable future malfunction ($D_f$), the presentation means being designed to present a synthetic predictive indicator representative of the foreseeable feasibility level ($F_p$).

14. The evaluation device according to claim 13, wherein the foreseeable feasibility level ($F_p$) depends on the information obtained about the mission (M).

15. The evaluation device according to claim 13, wherein the foreseeable feasibility level ($F_p$) depends on the at least one detected malfunction ($D_i$).

16. The evaluation device according to claim 13, wherein the foreseeable feasibility level ($F_p$) of the mission is set up to take at least three values different from each other, with the predictive indicator set up to represent each of said values.

17. The evaluation device according to claim 13, further comprising means for acquisition of parameters of the aircraft (PA), the means for establishment being set up to establish the foreseeable feasibility level ($F_p$) based on the acquired parameters of the aircraft (PA).

18. The evaluation device according to claim 12, wherein the observed feasibility level ($F_O$) of the mission is set up to take at least three values different from each other, with the reactive indicator set up to represent each of said values.

19. The evaluation device according to claim 12, further comprising means for acquisition of parameters of the aircraft (PA), the means for calculation being set up to calculate the observed feasibility level ($F_O$) based on the acquired parameters of the aircraft (PA).

20. A method for evaluation of the operational capabilities of an aircraft, comprising the following steps:

detecting at least one malfunction ($D_i$);

acquiring information (M) about the mission of the aircraft;

calculating, on the basis of each detected malfunction ($D_i$) and the information (M) obtained about the mission of the aircraft, an observed feasibility level ($F_O$) of the mission; and presenting a synthetic reactive indicator (124) that is representative for the observed feasibility level ($F_O$);

the preceding steps being repeated several times during the execution of the mission, in order to inform the user about the evolution of the observed feasibility level ($F_O$) of the mission depending on detection of new malfunctions ($D_i$) and/or modifications of the mission in course, wherein the calculating step comprises the following sub-steps:

determining at least one operational constraint ($LO_k$) caused by a detected malfunction or by each detected malfunction ($D_i$);

controlling an adequacy of each operational constraint ($LO_k$) with the mission and with the operational environment of the aircraft by determining, for each operational constraint ($LO_k$), an adequacy level ($A_k$) of the operational constraint ($LO_k$) with the mission of the aircraft; and determining the observed feasibility level ($F_O$) on the basis of each determined adequacy level ($A_k$).

21. A method for evaluation of the operational capabilities of an aircraft according to claim 20, further comprising the following steps:

determining a probable future malfunction ($D_f$);

establishing a foreseeable feasibility level ($F_p$) of the mission, in the case of occurrence of a probable future malfunction ($D_f$); and presenting a synthetic predictive indicator that is representative for the foreseeable feasibility level ($F_p$).

* * * * *